Patented Sept. 15, 1953

2,652,393

UNITED STATES PATENT OFFICE 2,652,393

POLYMERIZATION WITH ALKYL PHOSPHITE CATALYSTS

Joseph Benjamin Dickey and Harry Wesley Coover, Jr., Rochester, N. Y., assignors to Eastman Kodak Company, Rochester, N. Y., a corporation of New Jersey No Drawing. Application May 21, 1949, Serial No. 94,744

7 Claims. (Cl. 260—88.7)

This invention relates to the catalytic polymerization of of unsaturated organic compounds, wherein trialkyl phosphites and dialkyl acid phosphites are the polymerization catalysts.

The polymerization of vinyl compounds and other unsaturated organic compounds by a free-radical mechanism or by a cationic chain mechanism induced by acid catalyst is well known. The polymerization of methyl methacrylate, vinyl chloride, vinyl acetate, etc., by the use of peroxide type of catalyst is an example of the free-radical mechanism. The polymerization of isobutylene, styrene, vinyl ethers and $\alpha$-methyl styrene with boron trifluoride, stannic chloride or aluminum chloride are examples of the cationic chain mechanism.

Vinyl compounds have also been polymerized in the presence of sodium and organoalkalies. For example, sodium malonic ester has been employed in the polymerization of styrene [Hermann and Vorlander, Chem. Zent. 70, I, page 730 (1899)], while ethyl magnesium bromide, sodium and sodium ethoxide have been employed in the polymerization of allyl cyanide [Bruylants et al., Bull. Soc. Chim., Belg., 32, page 317 (1923); ibid. 35, page 239 (1926)]. The above processes wherein sodium and organoalkalies are used give mainly dimers and trimers and in no case any high-molecular-weight polymers are obtained. Alkyl phosphates and alkyl acid phosphates have also been proposed as catalysts for the polymerization of certain unsaturated materials, for example, for coumarone, indene, styrene, essential oils and unsaturated phenolic distillates.

However, not all unsaturated organic compounds can be polymerized by the known polymerization catalysts. For example, acrylonitrile is not homopolymerized to a resinous polymer by organic esters such as alkyl phosphates and alkyl acid phosphates, or by ionic catalysts such as boron trifluoride or boron trifluoride etherate. Alpha-trifluoromethyl acrylonitrile also is not homopolymerized to a resinous polymer by boron trifluoride and is also resistant to polymerization by peroxide type catalysts. Alpha-trifluoromethyl acrylamide also is not homopolymerizable to a resinous polymer by the conventional polymerization catalysts. In general, unsaturates which can be considered as having a low electron availability on the double bond are homopolymerizable to resinous polymers with difficulty or not at all by boron trifluoride and peroxide types of polymerization catalysts.

We have now found that ethylenically unsaturated compounds which contain one or two strongly electronegative groups attached to one of the double-bonded carbon atoms, and which can be represented by the general formula:

$$CH_2=C-X_1$$
$$\phantom{CH_2=C-}|$$
$$\phantom{CH_2=C-}X_2$$

wherein $X_2$ represents an atom of hydrogen, the group —$CHF_2$ or the group —$CF_3$ and $X_1$ represents the group —CN, the group

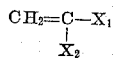

or the group

wherein $R_1$ represents an alkyl group containing from 1 to 4 carbon atoms (e. g. methyl, ethyl, propyl, butyl, etc.), an aryl group containing from 6 to 7 carbon atoms (e. g. phenyl, tolyl, etc.) or an aralkyl group containing from 7 to 8 carbon atoms (e. g. benzyl, phenylethyl, etc.), and wherein $R_2$ and $R_3$ each represents an atom of hydrogen, an alkyl group as defined above, an aryl group as defined above, and an aralkyl group as defined above, can be readily polymerized to resinous polymers in the presence of a trialkyl phosphite, a dialkyl hydrogen phosphite or a dialkyl alkali metal phosphite. The alkyl phosphite polymerization catalysts above mentioned do not require the added presence of either the boron trifluoride or the peroxide types of polymerization catalysts. It is remarkable that the alkyl phosphite catalysts of the invention not only initiate the homopolymerization of unsaturates having but a single strongly electronegative group attached to one of the double-bonded carbon atoms such as, for example, acrylonitrile, acrylamide, methacrylonitrile and methacrylamide, which unsaturates can also be homopolymerized by the conventional polymerization catalysts, but the alkyl phosphite catalysts also initiate the homopolymerization to resinous polymers of unsaturates having two strongly electronegative groups attached to one of the double-bonded carbon atoms such as, for example, alpha-difluoromethyl acrylonitrile, alpha-trifluoromethyl acrylontrile, alpha-difluoromethyl acrylamide, alpha-trifluoromethyl acrylamide and N-alkyl alpha-difluoromethyl and N-alkyl alpha-trifluoromethyl acrylamides wherein the alkyl group contains from 1 to 4 carbon atoms (e. g. N-methyl alpha-difluoromethyl acrylamide, N-ethyl alpha-trifluoromethyl acrylamide, N,N-dimethyl alpha-trifluoromethyl acrylamide, etc.), which unsaturates, however, are not homopolymerizable to resinous polymers by the conventional polymerization catalysts. The alkyl phosphite catalysts of the invention also homopolymerize to resinous polymers the alkyl esters of acrylic, methacrylic alpha-difluoromethyl acrylic and alpha-trifluoromethyl acrylic acids, wherein the alkyl group contains from 1 to 4 carbon atoms (e. g. methyl alpha-trifluoromethyl acrylate, methyl acrylate, etc.). The polymers resulting from the alkyl phosphite catalysts of the invention are for the most part clear, hard and moldable polymers which will not support combustion by themselves. The alkyl phosphite catalysts also readily initiate the copolymerization of the above-mentioned compounds with one another.

It is, accordingly, an object of the invention to provide a new and improved process for polymerizing to resinous polymers ethylenically unsaturated compounds having one or two strongly electronegative groups attached to one of the double-bonded carbon atoms. Another object is to provided a new process for copolymerizing to resinous copolymers such ethylenically unsaturated compounds. Still another object is to provide trialkyl and dialkyl acid and dialkyl alkali metal salt phosphites for initiating the polymerization to resinous polymers of such ethylenically unsaturated compounds. Other objects will become apparent hereinafter.

Specific examples of the alkyl phosphite catalysts of the invention are trialkyl phosphites, containing from 3 to 27 carbon atoms (e. g. trimethyl phosphite, triethyl phosphite, tri-n-propyl phosphite, triisopropyl phosphite, tri-n-butyl phosphite, tri-sec. butyl phosphite, tri-tert. butyl phosphite, tri-n-octyl phosphite, etc.), mixed-trialkyl phosphites wherein the alkyl groups are as above mentioned, dialkyl hydrogen phosphites and mixed-dialkyl hydrogen phosphites containing from 2 to 18 carbon atoms (e. g. dimethyl hydrogen phosphite, diethyl hydrogen phosphite, methyl ethyl hydrogen phosphite, etc.) and dialkyl alkali metal phosphites and mixed-dialkyl alkali metal phosphites containing from 2 to 18 carbon atoms (e. g. dimethyl sodium phosphite, dimethyl potassium phosphite, dimethyl lithium phosphite, diethyl sodium phosphite, methyl ethyl sodium phosphite, etc.).

In accordance with the practice of the invention, the polymerization to resinous polymers of the ethylenically unsaturated monomeric compounds previously mentioned as coming within the invention, alone or conjointly with one another, in the presence of one or more of the alkyl phosphite catalysts above mentioned, can be effected in mass or in the presence of an inert diluent (e. g. water, acetone-water mixtures, alcohols of the series $C_nH_{2n+1}OH$ such as methanol, ethanol, etc., 1,4-dioxane, acetonitrile, isopropyl ether, etc.). However, the monomers can also be emulsified in a liquid in which they are insoluble and the emulsion then subjected to polymerization in the presence of one or more of the alkyl phosphite catalysts. Where the monomers are insoluble in water, they can be suspended therein using a relatively poor dispersing agent (e. g. starch) and polymerized in granular form in the presence of one or more of the alkyl phosphite polymerization catalysts. The temperature of polymerization can advantageously be varied from −80° C. to 200° C., preferably from −50° C. to 100° C. Where the polymerization is carried out in an inert solvent such as those previously mentioned, the concentration of monomer or combined monomers can be varied widely, but for practical operation, the concentration of the monomers can be from 1 to 25 per cent by weight of the solvent employed. The amount of the alkyl phosphite polymerization catalysts can be varied from as low as 0.01 per cent to about 25 per cent of the total weight of the monomers charged into the reaction vessel. However, it is possible to use several times this higher amount, so that the alkyl phosphite catalyst functions not only as a catalyst, but at the same time as the reaction medium. The copolymers which can be prepared can contain variable amounts of two or more of the unsaturates previously mentioned as coming within the invention, and are obtained by the processes described with alkyl phosphites as catalysts by employing starting polymerization mixtures of the monomers containing not less than one per cent of the minor monomeric constituent.

The following examples will serve further to illustrate the practice of the invention.

*Preparation of methyl ethyl hydrogen phosphite*

133 grams of the dichloride of monomethyl dihydrogen phosphite (dichloromethylphosphine) were dissolved in 300 cc. of diethyl ether and the solution placed in a three-necked, round-bottom flask equipped with a stirrer, an inlet tube for air and a condenser. While slowly adding 100 grams of anhydrous ethanol, the reaction mixture was kept cool in an ice bath and air was bubbled through to remove as much of the hydrogen chloride which formed as possible. After a period of 30 minutes, dry ammonia gas was passed into the reaction mixture, and the ammonium chloride which precipitated was removed by filtration of the reaction mixture. More ammonia gas was then passed through the filtrate until all of the hydrogen chloride had been removed. The filtrate was then distilled to give 95 grams of methyl ethyl hydrogen phosphite boiling at 67° C. under 8 mm. pressure.

In a manner similar to that illustrated in the above example, other mixed-dialkyl hydrogen phosphites can be prepared. For example, by substituting other dichlorides of monoalkyl dihydrogen phosphites (e. g. the dichloride of monoethyl dihydrogen phosphite, or other anhydrous alcohols for the anhydrous ethanol such as methanol, n-propanol, n-butanol, isopropanol, and the like), in molecularly equivalent amounts of the quantity used in the above example, other mixed-dialkyl hydrogen phosphites such as those previously mentioned can be prepared.

The mixed-trialkyl phosphites (e. g. dimethyl ethyl phosphite, diethyl methyl phosphite, etc.) can be prepared in about the same manner as the mixed dialkyl hydrogen phosphites of the above example. The starting material for the mixed-trialkyl phosphites can likewise be a monoalkyl dihydrogen phosphite, but this is reacted with at least two equivalents of the desired alcohol in the presence of an organic nitrogen base such as pyridine, quinoline, triethylamine, and the like. The products can be separated from the reaction mixtures as previously described.

*Example 1*

10 grams of alpha-difluoromethyl acrylonitrile were cooled to −50° C. and 0.1 gram of triethyl phosphite was added. Polymerization started instantly. The mixture was then removed from the cooling bath and allowed to warm up to room temperature. The polymerization reaction was very exothermic and was completed within a few minutes. The polymer obtained was clear, hard and moldable, and was acetone-soluble. It would not support combustion. The above polymerization can also be carried out by adding only a trace of triethyl phosphite to the alpha-difluoromethyl acrylonitrile at room temperature.

*Example 2*

10 grams of alpha-trifluoromethyl acrylonitrile were cooled to −50° C. and 0.1 gram of triethyl phosphite was added thereto. The mixture was then removed from the cooling bath and allowed to come to room temperature. Within a few minutes, the polymerization was completed. There was thus obtained a clear, hard, thermoplastic, resinous polymer, which was moldable, soluble in acetone and would not support combustion by itself. The polymerization can also be carried out at room temperature, provided only a trace of the triethyl phosphite catalyst is used.

*Example 3*

10 grams of alpha-trifluoromethyl acrylonitrile were added to 20 cc. of diisopropyl ether and cooled to −50° C. One gram of triethyl phosphate was added slowly over a period of about one hour. The polymerization reaction was complete shortly after all the triethyl phosphite had been added. The polymer precipitated out of solution as rapidly as it was formed, and on separation from the liquid was obtained in almost a theoretical yield. The poly-alpha-trifluoromethyl acrylonitrile obtained was soluble in acetone, was readily moldable, and would not support combustion by itself.

*Example 4*

0.2 gram of diethyl hydrogen phosphite was added to 0.02 gram of metallic sodium in 10 cc. of isopropyl ether. When all the sodium had reacted, the suspension obtained was cooled to −30° C. and one gram of alpha-trifluoromethyl acrylonitrile added. The polymerization started on warming to room temperature and was complete in one hour. The poly-alpha-trifluoromethyl acrylonitrile obtained had the same characteristics as described in the preceding examples.

*Example 5*

0.2 gram of diethyl hydrogen phosphite was added to one gram of alpha-trifluoromethyl acrylonitrile in 10 cc. of isopropyl ether. After one hour at room temperature, the polymer of alpha-trifluoromethyl acrylonitrile began to precipitate. It had the same characteristics as described in the preceding examples.

*Example 6*

To 10 grams of alpha-difluoromethyl acrylamide in 25 cc. of acetonitrile, there was added 0.1 gram of triethyl phosphite. The polymerization reaction started immediately. The mixture was allowed to stand at room temperature for several hours. The poly alpha-difluoromethyl acrylamide precipitated out of solution as it formed. It was a white powder which could readily be molded and would not by itself support combustion.

In place of the alpha-difluoromethyl acrylamide in the above example, there can be substituted the same amount by weight of alpha-trifluoromethyl acrylamide to give a similar white precipitated polymer.

*Example 7*

10 grams of methyl alpha-trifluoromethyl acrylate were cooled to −50° C. and 0.1 gram of triethyl phospite was added thereto. The mixture began to thicken almost immediately and was removed from the cooling bath a few minutes later and allowed to come to room temperature. In 10 minutes the polymerization was complete, the poly-methyl alpha-trifluoromethyl acrylate being obtained as a clear, hard polymer, which was soluble in acetone, was readily moldable and would not support combustion by itself.

In place of the methyl alpha-trifluoromethyl acrylate in the above example, there can be substituted the same amount by weight of other alkyl acrylates such as ethyl alpha-trifluoromethyl acrylate, n-propyl alpha-trifluoromethyl acrylate, isopropyl alpha-trifluoromethyl acrylate, n-butyl alpha-trifluoromethyl acrylate, methyl alpha-difluoromethyl acrylate, ethyl alpha-difluoromethyl acrylate, n-propyl alpha-difluoromethyl acrylate, isopropyl alpha-difluoromethyl acrylate, or n-butyl alpha-difluoromethyl acrylate to give the corresponding homopolymers having similar properties to the polymer of the above example.

*Example 8*

10 grams of methyl alpha-trifluoromethyl acrylate were added to 20 cc. of diisopropyl ether and cooled to −50° C. One gram of triethyl phosphite was then added slowly over a period of about one hour. The polymerization reaction was complete shortly after the addition of all of the triethyl phosphite catalyst. The polymer of the above monomer precipitated out of solution as rapidly as it was formed. It was soluble in acetone and readily moldable, and was obtained in theoretical yield.

*Example 9*

10 grams of methacrylonitrile were added to 10 grams of triethyl phosphite in a reaction flask. Polymerization was complete after heating the reaction mixture at 60° C. for a period of several hours. The polymethacrylonitrile was obtained in the form of a viscous liquid.

*Example 10*

Several drops of triethyl phosphite were added to 5 grams of acrylonitrile and the mixture maintained in a cooling bath at room temperature during the polymerization reaction. In a short time, the polymerization of the acrylonitrile was complete. The polymer was soluble in acetonitrile. The time required for the complete polymerization of acrylonitrile can vary from several minutes to several hours depending on the reaction conditions.

*Example 11*

10 grams of acrylonitrile were added to 10 grams of triethyl phosphite. The temperature was maintained in a bath at approximately 60° C., but not exceeding this point at any time. After a period of about 2 hours, an almost theoretical yield of white polymer had precipitated. The polyacrylonitrile was filtered out, washed and dried. It was soluble in acetonitrile.

*Example 12*

10 grams of acrylamide and 3 grams of triethyl phosphite were dissolved in 20 cc. of acetonitrile.

The reaction mixture was heated to gentle reflux for 2 hours. The polyacrylamide precipitated out of solution as a white powdery material as rapidly as it formed.

In place of the acrylamide in the above example, there can be substituted an equivalent amount of methacrylamide to give polymethacrylamide.

*Example 13*

10 grams of methyl acrylate and 3 grams of triethyl phosphite were dissolved in 20 cc. of acetonitrile. The mixture was then heated to gentle reflux for 3 hours. The viscosity of the reaction mixture increased as the polymerization proceeded, until there was finally obtained a viscous dope of polymethylacrylate.

The monomeric alpha-difluoromethyl and alpha-trifluoromethyl acrylonitriles can be prepared as described in copending application Serial No. 94,742, filed of even date herewith, in the name of Joseph B. Dickey (now U. S. Patent 2,541,466, dated February 13, 1951). The monomeric alpha-difluoromethyl and alpha-trifluoromethyl acrylamides can be prepared as described in copending application Serial No. 94,741, filed of even date herewith, in the name of Joseph B. Dickey (now U. S. Patent 2,541,465, dated February 13, 1951). The monomeric alpha-difluoromethyl and alpha-trifluoromethyl alkyl acrylates can be prepared as described in copending application Serial No. 665,621, filed April 27, 1946, in the name of Joseph B. Dickey (now United States Patent 2,472,812, dated June 14, 1949).

We claim:

1. A process for preparing a resinous polymer of a monomeric unsaturated compound selected from the group having the general formula:

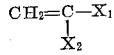

wherein $X_2$ represents a member selected from the group consisting of hydrogen, the group $-CHF_2$ and the group $-CF_3$, and $X_1$ represents a member selected from the group consisting of the group $-CN$, the group

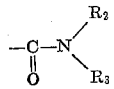

and the group

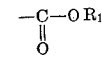

wherein $R_1$ represents an alkyl group containing from 1 to 4 carbon atoms, and $R_2$ and $R_3$ each represent a member selected from the group consisting of an atom of hydrogen and an alkyl group containing from 1 to 4 carbon atoms, which consists of intimately contacting, at a temperature of from $-80°$ to $200°$ C., the said monomeric unsaturated compound with from 0.01 to 25 per cent, based on the weight of the monomeric unsaturated compound, of an organic phosphite selected from the group consisting of a trialkyl phosphite wherein each alkyl group contains from 1 to 4 carbon atoms, a dialkyl hydrogen phosphite wherein each alkyl group contains from 1 to 4 carbon atoms and a dialkyl alkali-metal phosphite wherein each alkyl group contains from 1 to 4 carbon atoms.

2. A process for preparing resinous poly alpha-trifluoromethyl acrylonitrile which consists of intimately contacting, at a temperature of from $-80°$ to $200°$ C., alpha-trifluoromethyl acrylonitrile with from 0.01 to 25 per cent, based on the weight of the alpha-trifluoromethyl acrylonitrile, of a trialkyl phosphite wherein each alkyl group contains from 1 to 4 carbon atoms.

3. A process for preparing resinous poly alpha-trifluoromethyl acrylonitrile which consists of intimately contacting, at a temperature of from $-80°$ to $200°$ C., alpha-trifluoromethyl acrylonitrile with from 0.01 to 25 per cent, based on the weight of the alpha-trifluoromethyl acrylonitrile, of a dialkyl hydrogen phosphite wherein each alkyl group contains from 1 to 4 carbon atoms.

4. A process for preparing a resinous poly alpha-trifluoromethyl acrylonitrile which consists of intimately contacting, at a temperature of from $-80°$ to $200°$ C., alpha-trifluoromethyl acrylonitrile with from 0.1 to 25 per cent, based on the weight of the alpha-trifluoromethyl acrylonitrile, of a dialkyl alkali-metal phosphite wherein each alkyl group contains from 1 to 4 carbon atoms.

5. A process for preparing resinous poly alpha-trifluoromethyl acrylonitrile which consists of intimately contacting at a temperature of from $-80°$ to $200°$ C., alpha-trifluoromethyl acrylonitrile with from 0.01 to 25 per cent, based on the weight of the alpha-trifluoromethyl acrylonitrile, of triethyl phosphite.

6. A process for preparing resinous poly alpha-trifluoromethyl acrylonitrile which consists of intimately contacting, at a temperature of from $-80°$ to $200°$ C., alpha-trifluoromethyl acrylonitrile with from 0.01 to 25 per cent, based on the weight of the alpha-trifluoromethyl acrylonitrile, of diethyl hydrogen phosphite.

7. A process for preparing resinous poly alpha-trifluoromethyl acrylonitrile which consists of intimately contacting, at a temperature of from $-80°$ to $200°$ C., alpha-trifluoromethyl acrylonitrile with from 0.01 to 25 per cent, based on the weight of the alpha-trifluoromethyl acrylonitrile, of diethyl sodium phosphite.

JOSEPH BENJAMIN DICKEY.
HARRY WESLEY COOVER, Jr.

References Cited in the file of this patent

UNITED STATES PATENTS

| Number | Name | Date |
|---|---|---|
| 2,541,465 | Dickey | Feb. 13, 1941 |
| 2,380,473 | Stewart | July 31, 1945 |
| 2,543,636 | Loritsch | Feb. 27, 1951 |